(12) United States Patent
Morris (10) Patent No.: US 6,850,091 B2
(45) Date of Patent: Feb. 1, 2005

(54) BI-DIRECTIONAL IMPEDANCE MATCHING CIRCUIT

(75) Inventor: Bernard Lee Morris, Emmaus, PA (US)

(73) Assignee: Agere Systems, Inc., Allentown, PA (US)

( * ) Notice: Subject to any disclaimer, the term of this patent is extended or adjusted under 35 U.S.C. 154(b) by 12 days.

(21) Appl. No.: 10/410,009

(22) Filed: Apr. 9, 2003

(65) Prior Publication Data

US 2004/0201401 A1 Oct. 14, 2004

(51) Int. Cl.$^7$ .......................................... H03K 19/0185
(52) U.S. Cl. ............................. 326/86; 326/30; 326/56; 326/90; 326/58; 327/108
(58) Field of Search .............................. 326/86, 87, 30, 326/90, 56–58; 327/108; 710/100, 126

(56) References Cited

U.S. PATENT DOCUMENTS 5,602,494 A * 2/1997 Sundstrom .................. 326/39
6,166,563 A * 12/2000 Volk et al. .................. 326/87
6,690,191 B2 * 2/2004 Wu et al. .................... 326/30

* cited by examiner

Primary Examiner—Vibol Tan
(74) Attorney, Agent, or Firm—Nancy R. Gamburd (57) ABSTRACT

The present invention provides a bi-directional impedance matching integrated circuit which is couplable through an interface to a channel for signal transmission and reception. The invention includes a first switchable impedance and a second switchable impedance having a respective output impedance and input impedance substantially equal to a channel impedance. An impedance controller is capable of coupling the first switchable impedance to the interface in response to a transmit control signal, coupling the second switchable impedance to the interface in response to a receive control signal, and further capable of uncoupling the first switchable impedance and the second switchable impedance from a power supply and from a ground potential in response to a low power control signal. A mode selector is utilized to provide the transmit control signal, the receive control signal, and the low power control signal.

36 Claims, 2 Drawing Sheets

BI-DIRECTIONAL IMPEDANCE MATCHING CIRCUIT

FIELD OF THE INVENTION

The present invention relates, in general, to impedance matching circuits, and, in particular, to bi-directional impedance matching integrated circuits for signal transmission and reception.

BACKGROUND OF THE INVENTION

High speed buffers (or drivers) are used to transmit signals on a communication channel between and among integrated circuits ("ICs"). A signal to or from an IC is transmitted or received via a conductive interface material, typically referred to as a "PAD", which provides a signaling interface and physical connection between the IC and the channel.

In some cases, use of such high speed buffers often results in poor signal integrity of the transmitted signal due to an impedance mismatch between the high speed buffer output impedance ("$R_O$") and the channel impedance ("$Z_O$"). In other cases, poor signal integrity of a received signal often results from an impedance mismatch between the terminating or input impedance ("$R_T$") (present at the PAD or other interface) and the channel impedance $Z_O$. Typically, impedance matching of a transmission line is provided not only at the transmitting end, but also at the receiving end, and is referred to as a double-ended termination.

As a transmitter and receiver may both be coupled at the same end of a transmission line or channel, such as for full duplex communication, it is desirable to provide for impedance matching to the channel impedance $Z_O$ both for the output impedance $R_O$ for signal transmission and for the input impedance $R_T$ for signal reception. Prior art attempts to provide such dual impedance matching have been mixed. Typically in the prior art, the output buffer provides a controlled output impedance which matches the channel impedance $Z_O$. Matching the input impedance $R_T$ to the channel impedance $Z_O$, however, is typically accomplished through the use of additional, fixed external resistors, separately inserted or coupled at the channel interface (PAD). Among other drawbacks, in addition to being non-integrated and requiring separate fabrication steps, such prior art impedance matching solutions also increase power consumption, as power is always being dissipated through the fixed resistors.

SUMMARY OF THE INVENTION

The present invention provides a bi-directional impedance matching apparatus, which is couplable through an interface to a channel, such as a communication bus or a transmission line, for signal transmission and reception. The apparatus includes: a first switchable impedance having an output impedance substantially matching the channel impedance; a second switchable impedance having an input impedance substantially matching the channel impedance; and an impedance controller coupled to the first switchable impedance and the second switchable impedance. The impedance controller has a plurality of operating modes, and is capable of selectively coupling the first switchable impedance to the interface in a transmit mode of the plurality of operating modes, and the impedance controller further capable of selectively coupling the second switchable impedance to the interface in a receive mode of the plurality of operating modes. The impedance controller is further capable of uncoupling the first switchable impedance and the second switchable impedance from a power supply and from a ground (or substrate) potential in a low power mode of the plurality of operating modes.

The invention also includes a mode selector coupled to the impedance controller. The mode selector is capable of selecting an operating mode of the plurality of operating modes by providing a plurality of control signals to the impedance controller, which provides the selective coupling in response to the plurality of control signals, with the plurality of control signals comprising an enable signal, an inverted enable signal, a termination enable signal, and an inverted termination enable signal.

The impedance or resistance values of the first switchable impedance and the second switchable impedance are selected to appropriately match the impedance of a selected channel, such as a 50 Ohm channel impedance. As a consequence, use of the present invention in high speed buffers or other input and output circuitry preserves good or high signal integrity of both a transmitted signal and a received signal, due to providing accurate impedance matching between the output impedance, the input impedance, and the channel impedance. The present invention also may be embodied as an integrated circuit. In addition, the present invention provides a low power mode, to avoid power dissipation through the switchable impedances when not in use.

Numerous other advantages and features of the present invention will become readily apparent from the following detailed description of the invention and the embodiments thereof, from the claims and from the accompanying drawings.

BRIEF DESCRIPTION OF THE DRAWINGS

The objects, features and advantages of the present invention will be more readily appreciated upon reference to the following disclosure when considered in conjunction with the accompanying drawings, in which.

DETAILED DESCRIPTION OF THE PREFERRED EXAMPLES

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

Figure 1:
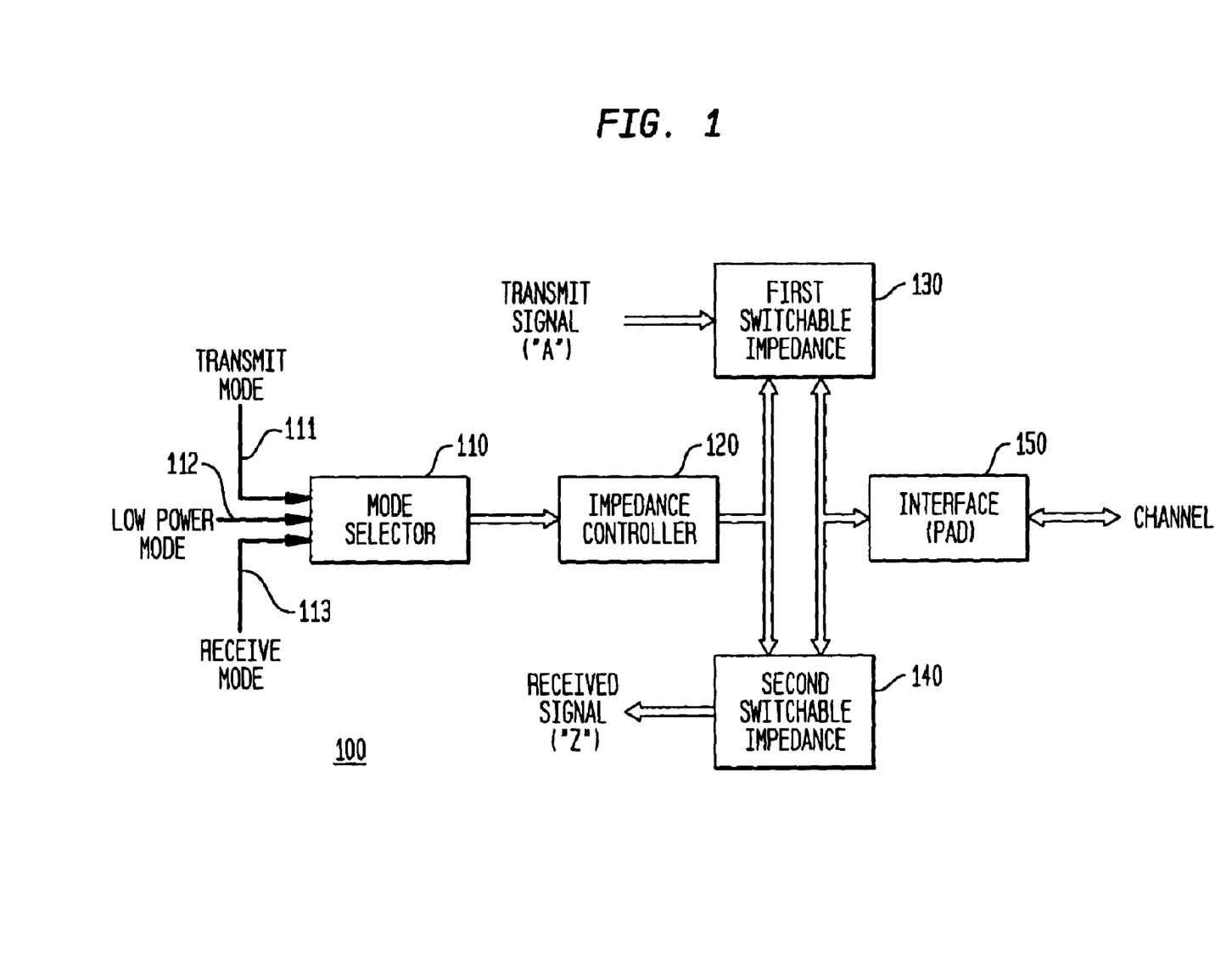
FIG. 1 is a block diagram illustrating a first exemplary apparatus embodiment 100 in accordance with the present invention.

FIG. 1 (or "FIG. 1") is a block diagram illustrating a first exemplary apparatus embodiment 100 in accordance with the present invention. As illustrated in FIG. 1, the apparatus 100 includes a mode selector 110, an impedance controller 120, a first switchable impedance 130, and a second switchable impedance 140. The apparatus 100 is generally couplable to a single interface 150 (also referred to as a "PAD" or input/output (I/O) node), which provides for an electrical interface between the apparatus 100 and the channel (transmission line or external load), for full duplex, digital communication over a channel, such as a communication bus for data transfer between and among ICs.

The apparatus 100 provides three different modes of operation: a transmit (or first) mode, a receive (or second) mode, and a low power or third mode. In the transmit mode, a signal to be transmitted (referred to herein as the "transmit signal"), consisting of digital information (or bits) referred to as "A", will be output through the interface 150. When the transmit mode is selected, using one or more inputs (111) or signals into mode selector 110, the impedance controller 120 provides for an input transmit signal ("A") to be coupled or switched through the first switchable impedance 130 to the interface 150 for output onto the channel. The first switchable impedance 130 is constructed to have an output impedance, $R_O$, which substantially matches the channel impedance, $Z_O$.

Similarly, a second or receive mode is provided in the apparatus 100. In the receive mode, a signal to be or being received (referred to herein as the "receive signal"), consisting of digital information (or bits) referred to as "Z", will be input through the interface 150. When the receive mode is selected, also using one or more inputs (113) or signals into mode selector 110, the impedance controller 120 couples or switches the second switchable impedance 140 to the interface 150, for reception of a signal ("Z") from the channel. The second switchable impedance 140 is also constructed to have an input or terminating impedance, $R_T$, which matches or is otherwise substantially equivalent to the channel impedance $Z_O$.

The substantial matching of either the output impedance to the channel impedance or the input impedance to the channel impedance may be an exact match, an approximate match, or a selected match within desired tolerance levels. For example, while a substantially exact match may be desirable for many applications, manufacturing tolerances may provide that the output impedance or the input impedance is only substantially close to, approximately or roughly equal to the channel impedance. (In the third exemplary embodiment, discussed below, only one of either the output impedance or the input impedance is substantially close to the channel impedance, with the other differing by a factor of two, which may be sufficient for some selected applications.)

In addition, while two switchable impedances 130 and 140 are illustrated, persons of ordinary skill in the art will appreciate that any number of switchable impedances, selectable by or through the impedance controller 120, may be included in the apparatus 100. For example, as illustrated in FIG. 2 and as discussed below for the exemplary apparatus 200, the first switchable impedance 230 is comprised of two subsections, 230A and 230B, which also elegantly share components with the second switchable impedance 140.

In accordance with the present invention, the channel and corresponding channel impedance, $Z_O$, should be construed broadly, such that "channel" as used herein includes any transmission line or external load, of any kind, and "channel impedance" includes any corresponding external impedance, such as a load impedance external to an output buffer, an output driver, a signal transmitter, an input buffer, or a signal receiver. Transmitter and receiver are also to be construed broadly to include any input or output (I/O) circuitry which, for example, is utilized for one IC to communicate with another IC or with any other external device, such as over a signaling, ISA, PCI or other computer or communication bus. The various exemplary embodiments may also be described as "bi-directional buffers" or more generally as circuits with input and output stages.

A third, low power mode is also provided in the apparatus 100. When the low power mode is selected, also using an input (112) to mode selector 110, the impedance controller 120 uncouples (or opens circuits) the first switchable impedance 130 and the second switchable impedance 140 from any power and/or ground connections, such that the impedance seen from the interface 150 or channel is very high (and, equivalently, may be effectively infinite). As a consequence, in the low power mode, power (DC power) is not dissipated through either the first switchable impedance 130 or the second switchable impedance 140. This low power mode may be used selectively, whenever any selected I/O circuit is not in use at any given time, even while neighboring or other I/O circuits may be in use within the same IC.

Figure 2:
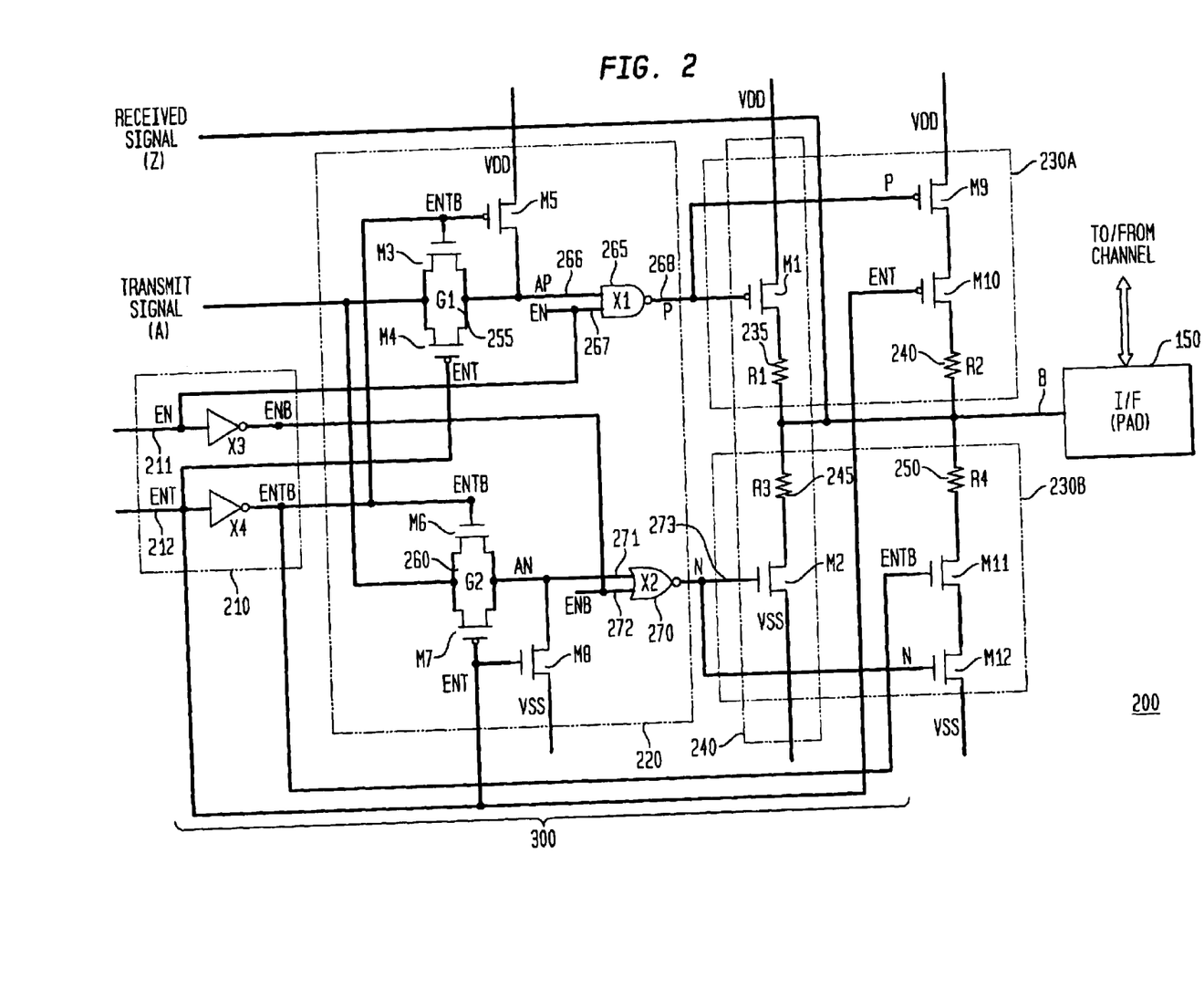
FIG. 2 is a circuit diagram illustrating second and third exemplary apparatus embodiments in accordance with the present invention.

FIG. 2 (or "FIG. 2") is a circuit diagram illustrating a second exemplary apparatus embodiment 200 and a third exemplary apparatus embodiment 300 in accordance with the present invention. Referring to FIG. 2, the second exemplary apparatus embodiment 200 includes a mode selector 210, an impedance controller 220, a first switchable impedance 230, illustrated as first switchable impedance 230A and 230B, and a second switchable impedance 240. As will become apparent, the apparatus 200 provides an elegant solution to providing both output impedance and input (terminating) impedance matching to a channel (or load) impedance.

The exemplary mode selector 210 utilizes two inputs: a first, "enable signal" ("EN") input 211; and a second, "termination enable signal" ("ENT") input 212. The enable signal and the termination enable signal, and their respective inverted forms (or inverted states) are utilized to provide the three operating modes discussed above, the transmit mode, the receive mode, and the low power mode. More specifically, the mode selector 110 provides, through inverters X3 and X4, respectively, an inverted state of the enable signal ("ENB" or "EN-bar"), referred to as the "inverted enable signal", and an inverted state of the termination enable signal ("ENTB" or "ENT-bar"), referred to as the "inverted termination enable signal". The two mode signals, the enable signal (EN) and the termination enable signal (ENT), and their inverted states, inverted enable signal (ENB) and inverted termination enable signal (ENTB), are provided as control signals throughout the apparatus 200 (to the gates of transistors M3 through M8, M10, M11, and as one of the inputs to NAND gate 265 and NOR gate 270), as illustrated in FIG. 2.

(It should be noted that while transistors M1, M4, M5, M7 M9 and M10 are illustrated as p-channel MOSFETs and transistors M2, M3, M6, M8, M11 and M12 are illustrated as n-channel MOSFETs, those of skill in the art will recognize that the apparatuses 200 and 300 may be implemented equivalently using other types and kinds of transistors, such as using either or both npn and pnp bipolar junction transistors or using either p-channel or n-channel FETs, and are included within the scope of the present invention.)

The exemplary impedance controller 220 includes a first transmission gate ("G1") 255, comprised of a transistor M3 coupled to the inverted termination enable signal (ENTB) and a transistor M4 coupled to the termination enable signal (ENT), and a second transmission gate ("G2") 260, comprised of a transistor M6 (coupled to the inverted termination enable signal (ENTB)) and a transistor M7 (coupled to the termination enable signal (ENT)). The impedance controller 220 further includes a NAND gate (X1) 265 and a NOR gate (X2) 270, as "pre-drivers". The NAND gate 265 has an input 266 provided from the output of the first transmission gate 255 ("AP") and a second input 267 of the enable signal (EN). The NOR gate 270 has an input on line 271 from the output of the second transmission gate (G2) 260 ("AN") and a second input on line 272 of the inverted enable signal (ENB). The transmit signal ("A") is provided as an input to both the first and second transmission gates 255 and 260. In addition, the impedance controller 220 includes a transistor MS having a gate input of the inverted termination enable signal (ENTB), and coupled between a DC power supply ("VDD") and the input on line 266 to the NAND gate 265; and includes a transistor M8 having a gate input of the termination enable signal (ENT), and coupled between a ground (or substrate) potential ("VSS") and the input on line 271 to the NOR gate 270. The operation of the exemplary impedance controller 220 will be explained in greater detail below.

The second switchable impedance 240 includes, as a series connection, a first, p-channel transistor M1, a first resistor 235 ("R1"), a second resistor 245 ("R3"), and a second, n-channel transistor M2. The input to the gate of transistor M1 is coupled on line 268 to the output ("P") of NAND gate 265, while the input to the gate of transistor M2 is coupled on line 273 to the output ("N") of NOR gate 270. As illustrated in FIG. 2, the drain of transistor M1 is coupled to the power supply (VDD), while the source of transistor M2 is coupled to a ground or substrate potential (VSS).

The various portions or sub-parts of the first switchable impedance 230, illustrated as first switchable impedance 230A and 230B, are each utilized depending upon the value (a high voltage (a logical one) or a low voltage (a logical zero)) of the transmit signal (A). The first switchable impedance 230A includes transistor M1 and resistor 235 (R1) from the second switchable impedance 240, and further includes transistors M9 and M10 (as switches) and resistor 240 (R2). The first switchable impedance 230B includes transistor M2 and resistor 245 (R3) from the second switchable impedance 240, and further includes transistors M11 and M12 (also as switches), and resistor 250 (R4). Switchable impedance 230A is utilized when the signal to be transmitted is a high voltage (a logical one or logical high), while switchable impedance 230B is utilized when the signal to be transmitted is a low voltage (a logical zero or logical low).

The first switchable impedance 230 and the second switchable impedance 240 are couplable to the interface 150 at node B. In addition, a receive signal ("Z") from the channel (via interface 150) may also be obtained at node B.

As mentioned above, three operating modes are provided in the apparatus 200, a transmit mode, a receive mode, and a low power mode. The low power mode is provided when the enable signal (EN) is a low voltage (i.e., when EN is a logical low, logical zero or, as used herein, simply "low"). The transmit and receive modes are provided when the enable signal EN is a high voltage (i.e., when the enable signal is a logical high, a logical one or, as used herein, simply "high"), and when the termination enable signal (ENT) is a low voltage or a high voltage, respectively. More particularly, the receive mode is provided when the termination enable signal (ENT) is a high voltage (i.e., a logical high or logical one), while the enable signal (EN) is also high; and the transmit mode is provided when the termination enable signal (ENT) is a low voltage (i.e., is a logical low or logical zero), while the enable signal is also high.

For the transmit mode, the voltages on the interface (PAD) 150 track identically the voltages of the transmit signal (A), such that when the transmit signal A is high, a high voltage appears on the interface 150, and when the transmit signal A is low, a low voltage appears on the interface (PAD) 150. In the transmit mode, the termination enable signal (ENT) is low, while the inverted termination enable signal (ENTB) is high, such that first and second transmission gates G1 (255) and G2 (260) are operative and conducting, with the result that the transmit signal A is transmitted or transferred through the transmission gates 255 and 260 and appears on input line 266 (as "AP") and appears on input line 271 (as "AN") (i.e., AP and AN follow A). As the inverted termination enable signal (ENTB) is high and the termination enable signal (ENT) is low, transistors M5 and M8, respectively, are off and not conducting. As the enable signal (EN) is also high, the input on line 267 is high, while the inverted enable signal (ENB) input on line 272 is low. As discussed in greater detail below, in this transmit mode, when "A" is high, "P" and "N" are both low, the interface 150 is high (tracking "A"); and when "A" is low, "P" and "N" are both high, and the interface 150 is low (also tracking "A").

When the transmit signal "A" is low, the output from NAND gate 265 ("P" on line 268) is high, such that the transistors M1 and M9 are off and not conducting, while the output from NOR gate 270 ("N" on line 273) is high, such that transistors M2 and M12 are on and conducting. In addition, as the inverted termination enable signal ENTB is high (termination enable signal (ENT) is low), transistor M11 is also on and conducting. As a consequence, the voltage on interface 150 (node B) is pulled to a low voltage (toward a ground potential or VSS), thereby tracking the transmit signal. In addition, the output impedance is a parallel combination of resistor 245 (R3) and resistor 250 (R4) ($1/R_O=1/R3+1/R4$). As discussed in greater detail below, the resistance values of resistors 245 and 250 (R3 and R4) should be selected to provide the desired output impedance which appropriately matches the channel impedance. For example, for a channel impedance of 50 Ohms, the resistance values of resistors R3 and R4 should be selected to be 100 Ohms each, thereby providing an output impedance $R_O$ of 50 Ohms, which would be an appropriate (and exact) match to the channel impedance. Those of skill in the art will recognize that there are numerous, equivalent ways to select these resistance values such that the parallel combination provides an appropriate match to the channel impedance.

When the transmit signal "A" is high, the output of NOR gate 270 ("N" on line 273) is low, such that transistors M2 and M12 are off and non-conducting. Similarly, the output of NAND gate 265 ("P" on line 268) is also low, thereby providing that transistors M1 and M9 are on and conducting. As the termination enable signal (ENT) is also low, transistor M10 is also on and conducting. As a consequence, the voltage on the interface 150 is pulled up to a high voltage (i.e., toward the power supply voltage (VDD)), also thereby tracking the transmit signal "A". In addition, the output impedance $R_O$ of the apparatus 200 is a parallel combination of resistor 235 (R1) and resistor 240 (R2) ($1/R_O=1/R1+1/R2$). The values of resistor 235 (R1) and resistor 240 (R2) should also be selected to provide an appropriate match to the channel impedance. Continuing with the example above, when the channel impedance is also 50 Ohms, R1 and R2 may be selected to be 100 Ohms each, which when combined in parallel, provide an output impedance $R_O$ of 50 Ohms. Again, those of skill in the art will recognize that there are numerous, equivalent ways to select these resistance values such that the parallel combination provides an appropriate match to the channel impedance.

For the receive mode, the termination enable signal (ENT) is high, the inverted termination enable signal (ENTB) is low, while the enable signal (EN) is also high. As the termination enable signal (ENT) is high and the inverted termination enable signal (ENTB) is low, first and second transmission gates 255 and 260 are off and non-conducting. As the inverted termination enable signal (ENTB) is low, transistor M5 is on, pulling the voltage ("AP") on line 266 high, toward the power supply voltage; as this input ("AP") into the NAND gate 265 is high, the output of NAND gate 265 (P) is low, turning on transistor M1. As the termination enable signal (ENT) is high, transistor M8 is on, pulling the NOR gate 270 input on line 271 ("AN") low, toward a ground potential; as the inverted enable signal (ENB) is also low, the output of NOR gate 270 ("N") on line 273 is high, turning on transistor M2. While transistors M9 and M12 are also on, because termination enable signal (ENT) is high and the inverted termination enable signal (ENTB) is low, transistors M10 and M11 are off and not conducting (providing no conductive path for R2 or R4). As a consequence, while the received signal ("Z") may be obtained at node B, the input (or terminating) impedance seen by the channel or interface 150 is a parallel combination of resistor 235 (R1) and resistor 245 (R3) ($1/R_T=1/R1+1/R3$) (as a Thevenin equivalent, with VDD equivalent to VSS for an AC signal). As mentioned above, the values of resistor 235 (R1) and resistor 245 (R3) should be selected to appropriately match the channel impedance. Continuing with the example above, when R1 and R3 are each 100 ohms, the input impedance is 50 Ohms, providing an appropriate match for a channel impedance of 50 Ohms.

Continuing to refer to FIG. 2, the low power mode is provided for the apparatus 200 when the enable signal (EN) is low, and the inverted enable signal (ENB) is high. Regardless of the values of the transmit signal ("A") or the termination enable signal ENT, the output of NAND gate 265 ("P") is high, and the output of NOR gate 270 ("N") is low. As the output "P" of NAND gate 265 is high, transistors M1 and M9 are off and not conducting. Similarly, as the output "N' of NOR gate 270 is low, transistors M2 and M12 are off and non-conducting. As a consequence, the first switchable impedance 230A and 230B and second switchable impedance 240 are uncoupled (or open circuited) from both the power supply (VDD) and ground (VSS), and left "floating". As a result, there are no longer any DC paths through the first switchable impedance 230A and 230B or the second switchable impedance 240, resulting in no internal termination and no DC power dissipation. (In this case, the termination impedance seen from the channel or the interface 150 is effectively infinite (or significantly high)).

FIG. 2 also illustrates a third exemplary apparatus embodiment 300 in accordance with the present invention, as an abbreviated version of apparatus 200. In the event a less complicated or smaller impedance matching circuit is desired (compared to the apparatus 200), portions of the first switchable impedance 230A and 230B may be omitted, namely, transistors M9, M10, M11 and M12, and resistors 240 and 250. In these circumstances, in the transmit mode, when "A" is high, the output impedance is resistor 235 (R1), while when transmit signal "A" is low, the output impedance is R3 (resistor 245). For example, if R1 and R3 are each 100 Ohms, then the output impedance in this abbreviated circuit is 100 ohms. Conversely, for the receive mode, the input impedance is R1 in a parallel combination with R3 which, for this example, would be 50 Ohms. As a result, for this abbreviated apparatus 300, either the input impedance or the output impedance will substantially match the channel impedance; however, depending upon the selected embodiment and tolerances, this less exacting or less suitable matching to the channel impedance may be acceptable under some circumstances, even though not preferable.

The following table provides a useful summary of the states of the various mode selection signals, enable signal (EN) and termination enable signal (ENT), for values of the transmit signal "A", the voltages at various nodes ("P" on line 268, "N" on line 273), the output voltages at interface 150 (as "PAD")), and the corresponding output and input impedances (with "1" being a high voltage or logical one, "0" being a low voltage or logical zero, "X" being a "don't care" or irrelevant value, and following the example above, the channel impedance being 50 Ohms, and with R1, R2, R3 and R4 each being selected to be 100 Ohms):

| Inputs | | | Nodes | | Output or Input | Mode | Impedance | Example |
|---|---|---|---|---|---|---|---|---|
| A | EN | ENT | P | N | PAD | | | Channel Impedance 50 Ohms |
| 0 | 1 | 0 | 1 | 1 | 0 (low) | Transmit | ($1/R_O = 1/R3 + 1/R4$) | Output Impedance 50 Ohms |
| 1 | 1 | 0 | 0 | 0 | 1 (high) | Transmit | ($1/R_O = 1/R1 + 1/R2$) | Output Impedance 50 Ohms |
| X | 1 | 1 | 0 | 1 | Received "Z" (1 or 0) | Receive | ($1/R_T = 1/R1 + 1/R3$) | Input Impedance 50 Ohms |
| X | 0 | X | 1 | 0 | X | Low Power | High | High |

As indicated above, the impedance (or resistance) values of the various resistors (R1, R2, R3 and R4) may be appropriately selected to accommodate and match any given channel or load impedance, in addition to the 50 Ohm channel impedance illustrated in the example above. For example, for the input impedance and the output impedance to match a 60 Ohm channel impedance, R1 and R4 may be selected to be 100 Ohms each, while R2 and R3 may be selected to be 150 Ohms each. Also for example, for the input impedance and the output impedance to match a 75 Ohm channel impedance, R1, R2, R3 and R4 may be selected to be 150 Ohms each. To avoid interfering with the selected transistor impedance matching, the various transistors M1 through M12, in general, should also be appropriately sized such that any associated resistance is effectively negligible in comparison to the various parallel combinations of the resistors R1, R2, R3 and R4. Those of skill in the art will recognize that there are innumerable, equivalent ways to select these resistance and transistor size values such that the various parallel combinations of R1 and R2, R3 and R4, and R1 and R3, provide an appropriate or substantial match of the input impedance and the output impedance to the channel impedance.

In summary, the present invention provides a bi-directional impedance matching apparatus (100, 200, 300), which is couplable through an interface 150 to a channel (having a channel impedance) for signal transmission and reception. The apparatus (100, 200, 300) includes: a first switchable impedance (130, 230A and 230B) having an output impedance substantially matching the channel impedance; a second switchable impedance (140, 240) having an input impedance substantially matching the channel impedance; and an impedance controller (120, 220) coupled to the first switchable impedance and the second switchable impedance. The impedance controller has a plurality of operating modes, and is capable of selectively coupling the first switchable impedance to the interface in a transmit mode of the plurality of operating modes, and the impedance controller further capable of selectively coupling the second switchable impedance to the interface in a receive mode of the plurality of operating modes. The impedance controller is further capable of uncoupling the first switchable impedance and the second switchable impedance from a power supply (VDD) and from a ground (or substrate) potential (VSS) in a low power mode of the plurality of operating modes.

The invention also includes a mode selector (110, 210) coupled to the impedance controller. The mode selector is capable of selecting an operating mode of the plurality of operating modes by providing a plurality of control signals to the impedance controller, which provides the selective coupling in response to the plurality of control signals, with the plurality of control signals comprising an enable signal, an inverted enable signal, a termination enable signal, and an inverted termination enable signal. The mode selector is capable of selecting the transmit mode when the enable signal has a first voltage (e.g., high or logical one) and the termination enable signal has a second voltage (e.g., low or logical zero), selecting the receive mode when the enable signal has the first voltage and the termination enable signal has the first voltage, and selecting a lower power mode is selected when the enable signal has the second voltage.

In the embodiment 210, the mode selector includes an enable signal input 210; a termination enable signal input 212; a first inverter (X3) coupled to the enable signal input to provide the inverted enable signal; and a second inverter (X4) coupled to the termination enable signal input to provide the inverted termination enable signal.

In the embodiment 220, the impedance controller includes a first transmission gate 255 having an input of a signal for transmission, and is coupled to the mode selector 210 to receive the termination enable signal and the inverted termination enable signal; a NAND gate 265 having a first input 266 coupled to an output of the first transmission gate 255 and a second input 267 coupled to the mode selector to receive the enable signal; a second transmission gate 260 having an input of the signal for transmission, and coupled to the mode selector 210 to receive the termination enable signal and the inverted termination enable signal; and a NOR gate 270 having a first input 271 coupled to an output of the second transmission gate and a second input 272 coupled to the mode selector 210 to receive the inverted enable signal.

Also in summary, when a signal for transmission has a first voltage, the first switchable impedance 230A comprises a first transistor M1 coupled to a first resistor R1 and further coupled in parallel with a second transistor M9 coupled to a second resistor R2, the first transistor M1 and the second transistor M9 further coupled to an output of the NAND gate 265 on line 268; and in the transmit mode, when a signal for transmission has the first voltage, the output impedance is substantially a parallel combination of a first resistor and a second resistor. When a signal for transmission has a second voltage, the first switchable impedance 230B comprises a third transistor M2 coupled to a third resistor R3 and further coupled in parallel with a fourth transistor M12 coupled to a fourth resistor R4, the third transistor M2 and the fourth transistor M12 further coupled to an output of the NOR gate 270 on line 273; and in the transmit mode, when the signal for transmission has a second voltage, the output impedance is substantially a parallel combination of a third resistor and a fourth resistor. Similarly, the second switchable impedance 240 comprises the first transistor M1 coupled to the first resistor R1 and further coupled in series with the third transistor M2 coupled to the third resistor R3; and in the receive mode, the input impedance is substantially a parallel combination of the first resistor and the third resistor.

The invention may also be embodied as an input and output integrated circuit (100, 200) which includes: a first switchable impedance (130, 230A and 230B) having an output impedance substantially equal to a channel impedance; a second switchable impedance (140, 240) having an input impedance substantially equal to the channel impedance; and an impedance controller (120, 220) coupled to the first switchable impedance and the second switchable impedance, the impedance controller having a plurality of operating modes in response to a plurality of control signals, wherein in a transmit mode of the plurality of operating modes, the impedance controller is capable of selectively coupling the first switchable impedance to the interface and providing an output signal to the interface, and wherein in a receive mode of the plurality of operating modes, the impedance controller is further capable of selectively coupling the second switchable impedance to the interface for reception of an input signal from the interface. In addition, the impedance controller, in a low power mode of the plurality of operating modes, is further capable of uncoupling the first switchable impedance and the second switchable impedance from a power supply and from a ground potential.

In this embodiment, a mode selector (110, 210) is capable of providing the plurality of control signals to the impedance controller, wherein the plurality of control signals comprises an enable signal (EN) and a termination enable signal (ENT), the enable signal having a first state and an inverted second state (ENB), and the termination enable signal having the first state and the inverted second state (ENTB). In response to the enable signal having the first state and the termination enable signal having the inverted second state, the impedance controller is in the transmit mode; in response to the enable signal having the first state and the termination enable signal having the first state, the impedance controller is in the receive mode; and in response to the enable signal having the inverted second state, the impedance controller is in a low power mode.

In the transmit mode, when a signal to be transmitted is in a first state, the impedance controller (120, 220) is capable of switching the first switchable impedance (130, 230A) to a power supply to provide the first state on the interface as the output signal, and when the signal to be transmitted is in a second state, the impedance controller is capable of switching the first switchable impedance (130, 230B) to a ground potential to provide the second state on the interface as the output signal. In the receive mode, the impedance controller is capable of switching the second switchable impedance (140, 240) between a power supply (VDD) and a ground potential (VSS).

The invention may also be embodied as a bi-directional impedance matching integrated circuit which is couplable through an interface to a channel for signal transmission and reception, the invention including: a first switchable impedance (130, 230A and 230B) having an output impedance substantially equal to the channel impedance; a second switchable impedance (140, 240) having an input impedance substantially equal to the channel impedance; an impedance controller (120, 220) coupled to the first switchable impedance and the second switchable impedance, the impedance controller capable of coupling the first switchable impedance to the interface in response to a transmit control signal, the impedance controller further capable of coupling the second switchable impedance to the interface in response to a receive control signal, and the impedance controller further capable of uncoupling the first switchable impedance and the second switchable impedance from a power supply and from a ground potential in response to a low power control signal; and a mode selector (110, 210) coupled to the impedance controller, the mode selector capable of providing the transmit control signal, the receive control signal, and the low power control signal. The transmit control signal, the receive control signal, and the low power control signal each comprise a selected combination of a first signal and a second signal, the first signal having a first state and a second state, and the second signal having the first state and the second state, such as EN, ENB, ENT and ENTB.

Numerous advantages of the present invention are readily apparent. Use of the present invention in high speed buffers or other I/O circuitry preserves good signal integrity of both a transmitted signal and a received signal, due to providing accurate impedance matching between the output impedance, the input impedance, and the channel impedance. The present invention may be embodied as an integrated circuit, and does not require the use of additional, external and fixed resistors and the corresponding additional and separate fabrication steps of the prior art. In addition, the present invention provides a low power mode, to avoid power dissipation through the switchable impedances when not in use.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

What is claimed is:

1. A bi-directional impedance matching apparatus, the bi-directional impedance matching apparatus couplable through an interface to a channel for signal transmission and reception, the channel having a channel impedance, the bi-directional impedance matching apparatus comprising:

a first switchable impedance having an output impedance substantially matching the channel impedance;

a second switchable impedance having an input impedance substantially matching the channel impedance; and an impedance controller coupled to the first switchable impedance and the second switchable impedance, the impedance controller having a plurality of operating modes, the impedance controller capable of selectively coupling the first switchable impedance to the interface in a transmit mode of the plurality of operating modes, the impedance controller further capable of selectively coupling the second switchable impedance to the interface in a receive mode of the plurality of operating modes, the impedance controller further capable of uncoupling the first switchable impedance and the second switchable impedance from a power supply potential and from a ground potential in a low power mode of the plurality of operating modes.

2. The bi-directional impedance matching apparatus of claim 1, further comprising:

a mode selector coupled to the impedance controller, the mode selector capable of selecting an operating mode of the plurality of operating modes by providing a plurality of control signals to the impedance controller, the plurality of control signals comprising an enable signal, an inverted enable signal, a termination enable signal, and an inverted termination enable signal.

3. The bi-directional impedance matching apparatus of claim 2, wherein the impedance controller is further capable of selectively coupling of the first switchable impedance and the second switchable impedance to the interface in response to the plurality of control signals.

4. The bi-directional impedance matching apparatus of claim 2, wherein the mode selector is capable of selecting the transmit mode when the enable signal has a first voltage and the termination enable signal has a second voltage, selecting the receive mode when the enable signal has the first voltage and the termination enable signal has the first voltage, and selecting the low power mode when the enable signal has the second voltage.

5. The bi-directional impedance matching apparatus of claim 2, wherein the mode selector further comprises:

an enable signal input;

a termination enable signal input;

a first inverter coupled to the enable signal input to provide the inverted enable signal; and a second inverter coupled to the termination enable signal input to provide the inverted termination enable signal.

6. The bi-directional impedance matching apparatus of claim 5, wherein the impedance controller further comprises:

a first transmission gate having an input of a signal for transmission, the first transmission gate further coupled to the mode selector to receive the termination enable signal and the inverted termination enable signal;

a NAND gate having a first input coupled to an output of the first transmission gate and a second input coupled to the mode selector to receive the enable signal;

a second transmission gate having an input of the signal for transmission, the second transmission gate further coupled to the mode selector to receive the termination enable signal and the inverted termination enable signal; and a NOR gate having a first input coupled to an output of the second transmission gate and a second input coupled to the mode selector to receive the inverted enable signal.

7. The bi-directional impedance matching apparatus of claim 6, wherein:

when a signal for transmission has a first voltage, the first switchable impedance comprises a first transistor coupled to a first resistor and further coupled in parallel with a second transistor coupled to a second resistor, the first transistor and the second transistor further coupled to an output of the NAND gate; and when a signal for transmission has a second voltage, the first switchable impedance comprises a third transistor coupled to a third resistor and further coupled in parallel with a fourth transistor coupled to a fourth resistor, the third transistor and the fourth transistor further coupled to an output of the NOR gate.

8. The bi-directional impedance matching apparatus of claim 7, wherein:

the second switchable impedance comprises the first transistor coupled to the first resistor and further coupled in series with the third transistor coupled to the third resistor.

9. The bi-directional impedance matching apparatus of claim 1, wherein in the transmit mode, when a signal for transmission has a first voltage, the output impedance is substantially a parallel combination of a first resistor and a second resistor.

10. The bi-directional impedance matching apparatus of claim 9, wherein in the transmit mode, when the signal for transmission has a second voltage, the output impedance is substantially a parallel combination of a third resistor and a fourth resistor.

11. The bi-directional impedance matching apparatus of claim 10, wherein in the receive mode, the input impedance is substantially a parallel combination of the first resistor and the third resistor.

12. The bi-directional impedance matching apparatus of claim 1, wherein the bi-directional impedance matching apparatus is embodied as an integrated circuit.

13. An input and output integrated circuit, the input and output integrated circuit couplable through an interface to a channel, the input and output integrated circuit comprising:

a first switchable impedance having an output impedance substantially equal to a channel impedance;

a second switchable impedance having an input impedance substantially equal to the channel impedance; and an impedance controller coupled to the first switchable impedance and the second switchable impedance, the impedance controller having a plurality of operating modes in response to a plurality of control signals, wherein in a transmit mode of the plurality of operating modes, the impedance controller is capable of selectively coupling the first switchable impedance to the interface and providing an output signal to the interface, wherein in a receive mode of the plurality of operating modes, the impedance controller is further capable of selectively coupling the second switchable impedance to the interface for reception of an input signal from the interface, and wherein in a low power mode of the plurality of operating modes, the impedance controller is further capable of uncoupling the first switchable impedance and the second switchable impedance from a power supply potential and from a ground potential.

14. The input and output integrated circuit of claim 13, further comprising:

a mode selector coupled to the impedance controller, the mode selector capable of providing the plurality of control signals, wherein the plurality of control signals comprises an enable signal and a termination enable signal, the enable signal having a first state and an inverted second state, and the termination enable signal having the first state and the inverted second state.

15. The input and output integrated circuit of claim 14, wherein in response to the enable signal having the first state and the termination enable signal having the inverted second state, the impedance controller is in the transmit mode; wherein in response to the enable signal having the first state and the termination enable signal having the first state, the impedance controller is in the receive mode; and wherein in response to the enable signal having the inverted second state, the impedance controller is in the low power mode.

16. The input and output integrated circuit of claim 13, wherein in the transmit mode, when a signal to be transmitted is in a first state, the impedance controller is capable of switching the first switchable impedance to the power supply potential to provide the first state on the interface as the output signal, and when the signal to be transmitted is in a second state, the impedance controller is capable of switching the first switchable impedance to the ground potential to provide the second state on the interface as the output signal.

17. The input and output integrated circuit of claim 13, wherein in the receive mode, the impedance controller is capable of switching the second switchable impedance between the power supply potential and the ground potential.

18. The input and output integrated circuit of claim 17, wherein the second switchable impedance comprises a series coupling of a first transistor, a first resistor, a second resistor, and a second transistor, the first and second resistors further couplable to the interface for reception of the input signal.

19. The input and output integrated circuit of claim 13, wherein in the transmit mode, when a signal for transmission has a first voltage, the output impedance is a parallel combination of a first resistor and a second resistor.

20. The input and output integrated circuit of claim 19, wherein in the transmit mode, when the signal for transmission has a second voltage, the output impedance is a parallel combination of a third resistor and a fourth resistor.

21. The input and output integrated circuit of claim 20, wherein in the receive mode, the input impedance is a parallel combination of the first resistor and the third resistor.

22. A bi-directional impedance matching integrated circuit, the bi-directional impedance matching integrated circuit couplable through an interface to a channel for signal transmission and reception, the channel having a channel impedance, the bi-directional impedance matching integrated circuit comprising:

a first switchable impedance having an output impedance substantially equal to the channel impedance;

a second switchable impedance having an input impedance substantially equal to the channel impedance;

an impedance controller coupled to the first switchable impedance and the second switchable impedance, the impedance controller capable of coupling the first switchable impedance to the interface in response to a transmit control signal, the impedance controller further capable of coupling the second switchable impedance to the interface in response to a receive control signal, and the impedance controller further capable of uncoupling the first switchable impedance and the second switchable impedance from a power supply potential and from a ground potential in response to a low power control signal; and a mode selector coupled to the impedance controller, the mode selector capable of providing the transmit control signal, the receive control signal, and the low power control signal.

23. The bi-directional impedance matching integrated circuit of claim 22, wherein the transmit control signal, the receive control signal, and the low power control signal each comprise a selected combination of a first signal and a second signal, the first signal having a first state and a second state, and the second signal having the first state and the second state.

24. The bi-directional impedance matching integrated circuit of claim 23, wherein the receive control signal comprises the first signal in the first state and the second signal in the first state; wherein the transmit control signal comprises the first signal in the first state and the second signal in the second state; and wherein the low power control signal comprises the first signal in the second state.

25. The bi-directional impedance matching integrated circuit of claim 22, wherein in response to the transmit control signal, when a signal to be transmitted has a first voltage, the impedance controller is capable of switching the first switchable impedance to the power supply potential to provide the first voltage on the interface as the output signal, and when the signal to be transmitted has a second voltage, the impedance controller is capable of switching the first switchable impedance to the ground potential to provide the second voltage on the interface as the output signal.

26. The bi-directional impedance matching integrated circuit of claim 22, wherein in response to the receive control signal, the impedance controller is capable of switching the second switchable impedance between the power supply potential and the ground potential.

27. A bi-directional impedance matching apparatus, the bi-directional impedance matching apparatus couplable through an interface to a channel for signal transmission and reception, the channel having a channel impedance, the bi-directional impedance matching apparatus comprising:
    a first switchable impedance having an output impedance substantially matching the channel impedance;
    a second switchable impedance having an input impedance substantially matching the channel impedance;
    an impedance controller coupled to the first switchable impedance and the second switchable impedance, the impedance controller having a plurality of operating modes, the impedance controller adapted to selectively couple the first switchable impedance to the interface in a transmit mode of the plurality of operating modes, and the impedance controller further adapted to selectively couple the second switchable impedance to the interface in a receive mode of the plurality of operating modes; and
    a mode selector coupled to the impedance controller, the mode selector adapted to select an operating mode of the plurality of operating modes by providing a plurality of control signals to the impedance controller, the plurality of control signals comprising an enable signal, an inverted enable signal, a termination enable signal, and an inverted termination enable signal.

28. The bi-directional impedance matching apparatus of claim 27, wherein the impedance controller is further adapted to selectively couple the first switchable impedance and the second switchable impedance to the interface in response to the plurality of control signals.

29. The bi-directional impedance matching apparatus of claim 27, wherein the mode selector is adapted to select the transmit mode when the enable signal has a first voltage and the termination enable signal has a second voltage, select the receive mode when the enable signal has the first voltage and the termination enable signal has the first voltage, and select a lower power mode when the enable signal has the second voltage.

30. The bi-directional impedance matching apparatus of claim 27, wherein the mode selector further comprises:
    an enable signal input;
    a termination enable signal input;
    a first inverter coupled to the enable signal input to provide the inverted enable signal; and
    a second inverter coupled to the termination enable signal input to provide the inverted termination enable signal.

31. A bi-directional impedance matching apparatus, the bi-directional impedance matching apparatus couplable through an interface to a channel for signal transmission and reception, the channel having a channel impedance, the bi-directional impedance matching apparatus comprising:
    a first switchable impedance having an output impedance substantially matching the channel impedance, wherein in a transmit mode, when a signal for transmission has a first voltage, the output impedance is substantially a parallel combination of a first resistor and a second resistor;
    a second switchable impedance having an input impedance substantially matching the channel impedance; and
    an impedance controller coupled to the first switchable impedance and the second switchable impedance, the impedance controller having a plurality of operating modes, the impedance controller capable of selectively coupling the first switchable impedance to the interface in the transmit mode of the plurality of operating modes, and the impedance controller further capable of selectively coupling the second switchable impedance to the interface in a receive mode of the plurality of operating modes.

32. The bi-directional impedance matching apparatus of claim 31, wherein in the transmit mode, when the signal for transmission has a second voltage, the output impedance is substantially a parallel combination of a third resistor and a fourth resistor.

33. The bi-directional impedance matching apparatus of claim 32, wherein in the receive mode, the input impedance is substantially a parallel combination of the first resistor and the third resistor.

34. An input and output integrated circuit, the input and output integrated circuit couplable through an interface to a channel, the input and output integrated circuit comprising:
    a first switchable impedance having an output impedance substantially equal to a channel impedance;
    a second switchable impedance having an input impedance substantially equal to the channel impedance;
    an impedance controller coupled to the first switchable impedance and the second switchable impedance, the impedance controller having a plurality of operating modes in response to a plurality of control signals, wherein in a transmit mode of the plurality of operating modes, the impedance controller is adapted to selectively couple the first switchable impedance to the interface and provide an output signal to the interface, and wherein in a receive mode of the plurality of operating modes, the impedance controller is further adapted to selectively couple the second switchable impedance to the interface for reception of an input signal from the interface; and
    a mode selector coupled to the impedance controller, the mode selector adapted to provide the plurality of control signals, wherein the plurality of control signals comprises an enable signal and a termination enable signal, the enable signal having a first state and an inverted second state, and the termination enable signal having the first state and the inverted second state.

35. The input and output integrated circuit of claim 34, wherein in response to the enable signal having the first state and the termination enable signal having the inverted second state, the impedance controller is in the transmit mode; wherein in response to the enable signal having the first state and the termination enable signal having the first state, the impedance controller is in the receive mode; and wherein in response to the enable signal having the inverted second state, the impedance controller is in a low power mode.

36. The input and output integrated circuit of claim 34, wherein in the transmit mode, when a signal to be transmitted is in a first state, the impedance controller is adapted to switch the first switchable impedance to a power supply potential to provide the first state on the interface as the output signal, and when the signal to be transmitted is in a second state, the impedance controller is adapted to switch the first switchable impedance to a ground potential to provide the second state on the interface as the output signal.

* * * * *